United States Patent [19]
Niesen

[11] Patent Number: 4,801,381
[45] Date of Patent: Jan. 31, 1989

[54] ULTRAFILTRATION APPARATUS

[76] Inventor: Lawrence J. Niesen, 3 Hooks La., Edgewater, N.J. 07020

[21] Appl. No.: 874,549

[22] Filed: Jun. 16, 1986

[51] Int. Cl.$^4$ .............................................. B01C 13/00
[52] U.S. Cl. ............................ 210/321.84; 210/323.2; 210/336
[58] Field of Search ............... 210/335, 336, 346, 347, 210/486, 433.2, 321.1, 456, 323.2, 321.84

[56] References Cited

U.S. PATENT DOCUMENTS

| | | | |
|---|---|---|---|
| 3,494,468 | 2/1970 | Kohl ................................. | 210/346 X |
| 4,255,263 | 3/1981 | Galimi et al. ................. | 210/433.2 X |
| 4,613,436 | 9/1986 | Wight et al. ................. | 210/433.2 X |

OTHER PUBLICATIONS

Breysse et al., Re. 30, 632, Separation Apparatus, 6-2-81, 210-433.2 X.

Primary Examiner—Frank Spear
Attorney, Agent, or Firm—Kenyon & Kenyon

[57] ABSTRACT

An ultrafiltration apparatus in which a plurality of support panels are arranged to form a stack, with panel faces each carrying a membrane for separating a base liquid into two fractions. Apertures are formed in the panels, and the stack is arranged so that these apertures are in registration to form ducts within the stack. Longitudinal ribs are formed in the panel faces, with longitudinal channels on either side of same. Transverse ribs are formed between adjacent longitudinal channels, with transverse channels between adjacent such ribs. Turbulence reduction flanges are inserted between selected panels within the stack to divide same into subassemblies, which direct fluid flow from the top of one subassembly to the bottom of the succeeding subassembly, providing bottom-to-top flow across the panel faces throughout the stack. The fraction of base fluid that flows through the membrane is collected in the transverse channels and thense flows in the longitudinal channels to a permeate extraction duct, where such permeate can be extracted.

24 Claims, 4 Drawing Sheets

ULTRAFILTRATION APPARATUS

BACKGROUND OF THE INVENTION

This invention pertains to the art of separating a liquid into fractions by pressure-driven flow through semipermeable membranes, known as ultrafiltration, and more particularly, to apparatus adapted to accomplish that task.

Ultrafiltration is the general term applied to the process of separating a liquid into fractions by pressure-driven flow through semi-permeable membranes. By proper selection of the membrane material, it is possible to separate liquids based upon molecular weight, thus obtaining a permeate of extremely high purity. Such processes find wide application in a number of industries, as for separating milk used in cheese making into whey and milk precheese product, and in concentrating antibiotics from a fermentation broth.

Two distinctions are important in identifying the position of the present invention in relation to the art. First, the art classifies filtraton processes into microfiltration, ultrafiltraton, and hyperfiltration (or reverse osmosis). The distinction between these processes is based primarily upon the pore size of the membranes employed and the pressure at which the systems operate. Microfiltration operates at a relatively large pore size (0.02–2.0 micron) and low pressure (30–150 psi). Hyperfilatration, or reverse osmosis, operates at pore sizes from the range of 5–15 angstroms down to the micromolecular and ionic size range (molecular weights of 150 and below), and at pressures in the range 200–1000 psi. Ultrafiltration operates at values between these two processes, at molecular weight cutoffs ranging from 200 to 350,000 and pore diameters of from about 10 to 1000 angstroms. Although the preferred embodiment of the present invention is directed primarily toward ultrafiltration, the invention would operate equally well in a microfiltration role, and it could be adapted to hyperfiltration equipment as well.

Second, the field of ultrafiltration encompasses several means of effecting the separation of a liquid into fractions. At the outset, it should be understood that ultrafiltration does not operate in a manner analogous to "filtering" processes, in which a liquid is passed through a filter disposed transverse to the flow path, with undesirable solids being retained by the filter and the objective being a clarified liquid output. Rather, ultrafiltration seeks to separate a base liquid into two fractions by placing the liquid in the presence of a semi-permeable membrane; one portion of the liquid (termed the permeate) will pass through the membrane, and the other will remain in the base liquid stream, termed the retenate. Thus, ultrafiltration systems pass a base liquid across, rather than through, the filration means. Also, depending upon the specific application, one fraction or the other may be the desired product of the process. For example, in cheese manufacure, the desired product is the retenate (precheese liquid), while in a juice manufacturing process the object is the permeate, a clarified fruit juice.

Several methods of ultrafiltration have been suggested by the art. Of primary concern to the present invention are the methods classified as "plate and frame" ultrafiltration, in which a series of plates supports semipermeable membranes, and the base liquid is passed across these membranes for filtration. Other methods include spiral membrane apparatus, in which the membrane is wrapped in a perforated collection tube, the base liquid being passed through the tube longitudinally. A membrane also may be presented in tubular form, with the base liquid passed within the tube and the permeate passing through the tube and collecting within the membrane housing. Alternatively, hollow fiber membranes have been offered, with a bundle of hollow fiber membranes contained within a tubular housing. Base liquid is passed though the cores of the fibers, and permeate is collected from the channels surrounding the fibers. The disadvantages of these methods, when compared to the present invention, will be clear to those skilled in the art.

The preferred plate-and-frame processes depend, of course, on the presentation of a large membrane area to the base liquid, and it is known in the art to employ membrane supports, with membrane material disposed on both sides of a plate and the plates arranged in a stack. Generally, such a stack is provided with input and output flow passages for the base liquid, disposed on opposite sides of the stack such that liquid can flow to one side of a plate and thence between the membranes of adjacent plates, allowing the base liquid to come into intimate contact, under pressure, with the membrane surface to permit ultrafiltration. Because one pass through the system generally does not suffice to provide complete extraction of the desired constituents, the retenate usually is recirculated through the ultrafiltration apparatus several times. Further, it is known to divide the stack into subassemblies, each subassembly having input and output passages, such that liquid flows in parallel across the membranes of all support members of a subassembly, and the output of one subassembly flows to the input of a succeeding subassembly.

The apparatus available to date has exhibited a number of problems. Ultrafiltration equipment is evaluated based on two criteria—the concentration ratio, reflecting the maximum concentration to which the base liquid can be processed (defined as the ratio of initial volume of base liquid to the final volume after processing), and the flux rate, defined as the volume of permeate that passes through a given area of membrane per unit of time, generally expressed as gallons of permeate per square foot of membrane per day (GFD). These two factors will determine the specifications of an ultrafiltration apparatus chosen for a particular application.

Typical of the apparatus offered by the art is the ellipsoidal structure seen in U.S. Pat. No. 3,872,015, issued to Madsen. As disclosed, the apparatus is similar to that discussed above, with each plate-like member being ellipsoidal in form. Each plate also has two openings formed toward the ends of the major axis, so that when the stack is formed by passing retaining bolts through the aligned openings, inlet and outlet passages are formed. Curved grooves in the surface of the plate extend from one opening to the other. These grooves generally can be described as forming a set of concentric ellipses of increasingly smaller periphery. Blocking members placed in one opening of periodically-spaced members serve to divide the stack into subassemblies, as discussed.

Base liquid flows through the inlet passage of a subassembly and passes into the gap between adjacent membranes. The fluid pressure of the base liquid forces both membranes against the respective plate surfaces, so that liquid flows within channels corresponding to the surface grooves. Given that the fluid pressure at the head of all channels is equal and that the flow path in the outer channels is significantly longer than that of the inner channels, basic principles of fluid dynamics would lead one to expect the flow velocity in the inner channels to be significantly greater than in the outer channels. That expectation is borne out in operation. As the viscosity of the retenate increases, fluid velocity in the outer channels decreases, ultimately dropping to zero, at which point the channel plugs. The relatively short inner channels in effect "short-circuit" the flow pattern, and this process continues as the base liquid becomes more concentrated with repeated recirculation through the system.

The assignee of this patent has attempted to alleviate this problem by eliminating the central portion of the plate, leaving an ellipsoidal ring, and by increasing the dept of the outer (longer) channels. That design does ameliorate the plugging problem, but at the expense of reduced output (from reduced membrane area) and higher cost (from inefficient production of membrane material—the cutout central section cannot be put to other use). Moreover, observation of this design reveals that the uneven flow rate leads to uncertainty as to which channels will plug first, as sometimes an inner channel plugs, and at other times an outer channel will become blocked. The problems with this design stem directly from the provision of flow channels of uneven length, and appear inherent in such configurations.

An alternative approach is disclosed in U.S. Pat. No. Re. 30,632 (a reissue of U.S. Pat. No. 3,831,763), to Breysse. The basic structure of this device is similar to that discussed above, but here the plates are rectangular, and joining members are disposed between adjacent plates to promote sealing and to define the space into which the base liquid flows between plates. Each plate has two openings, defining inlet and outlet passages, and intermediate plates, having only one such opening, serve to divide the stack into subassemblies. A depression is formed into the surface of both sides of a plate, and packing material is carried therein to permit collection of permeate, and the membranes are carried atop this material. A variant form of this device, offered by the assignee of this patent, substitutes raised ridges, formed in the surface of the depression and extending across same.

Two problems have arisen in the application of this device to fields requiring operation over wide viscosity ranges. First, the inclusion of joining members (typically, gaskets) at the outer periphery of each plate limits the pressure at which the base liquid can be introduced into the inlet passages. Of course, such a limitation restricts the overall flow rate and the resultant output.

This design also does not prevent deposition of solids from the base liquid, particularly in high-viscosity applications. As with the previous device, the problem stems from the basic principles of fluid dynamics. It is well known that fluid flow within a channel is not uniform but exhibits a velocity profile from one side of the channel to the other. Velocity is lowest at the sides of the channel (indeed, it is zero within a boundary layer in contact with the channel wall). Further, the velocity differential across the channel is related to the viscosity of the fluid (higher viscosity produces a higher differential) and to the size of the channel (wider channels result in a more pronounced zone of significantly lower velocity). These theoretical predictions again are seen to occur in practice. When employed in an antibiotic application, where the base fluid contains a high level of suspended solids, flow velocity of the broth at the edges of this device is not sufficiently high to avoid deposition, restricting the flow to an increasingly small area toward the center of each plate. Output suffers, both from the reduced permeate flow and from the increased requirement to clean and change membranes.

A common shortcoming of these devices is the failure to provide uniform flow across the surface of each plate, at flow rates that offer economically-attractive permeate recovery. It is to these problems that the present invention is directed.

SUMMARY OF THE INVENTION

It is an object of this invention to provide an ultrafiltration apparatus that permits improved operation over a wide range of base liquid viscosities.

Another object of the invention is an improved membrane support for an ultrafiltration apparatus.

A further object of the invention is to provide a membrane support for an ultrafiltration apparatus that allows for uniform flow across the surface of the support.

Yet another object of the invention is the provision of an ultrafiltration apparatus that offers improved performance in reducing the turbulence associated with the transition from one stack subassembly to another such subassembly.

These and other objects are achieved in the present invention. In a preferred embodiment, an ultrafiltration apparatus includes a plurality of support panels arranged to form a stack. Each panel is generally flat and rectangular in shape, with two flat faces identically formed. Raised edges run around the periphery of one face of each panel to allow base liquid to flow between adjacent panels in the stack. Two apertures are formed near the periphery of each panel, preferably on opposite sides thereof. Panels are stacked with these apertures in alignment, to form inlet and outlet ducts. Two types of rings are carried around the perimeter of each aperture, with rings of the same type disposed on one panel face. Distribution rings, include distribution apertures in the periphery of the ring to direct fluid flow in selected directions, and sealing rings have flat upper surfaces. Panels are stacked with the distribution rings of one panel bearing against the sealing rings of the adjacent panel, effecting a seal within the duct. A membrane is carried on each face of each panel, overlying the raised edges thereof, so that the clamping force exerted by such edges of adjacent panels forms a seal for the stack as a whole.

Longitudinal ribs, running from one aperture to the other and preferably spaced equidistantly, are formed in both faces of each panel, with longitudinal channels disposed on either side of each such rib. In the area between such channels is a plurality of transverse ribs, with transverse channels lying between adjacent such ribs. To provide optimum retenate flow, the top surface of these transverse ribs lies below the top surface of the longitudinal ribs, and to provide optimum permeate flow, the bottom of the transverse channels lies above the bottom of the longitudinal channels. A connecting channel, preferably at least equal in depth to the longitudinal channels, extends around the portion of the support member surface into which the longitudinal and transverse ribs are formed. A permeate extraction port, preferably located at the top of the support member, communicate with the connecting channel and permits collection of permeate; this duct is adapted for connection to fluid communication means, such as plastic tubing, for conveying the permeate to a collection means. Permeate collects in the transverse channels flows to the longitudinal channels and thence to the connecting channel, and exits through the permeate extraction port.

Support panels are assembled into a stack, with end plates located on each end of the stack. A compressive force is applied to the stack through the end plates to retain panels in position and effect the respective seals. In a preferred form, the stack is subdivided into modules, each module including a number of panels, by providing turbulence reduction flanges within the stack. These units receive fluid from the outlet duct of a module and direct that fluid to the opposite side of the stack for introduction into the inlet duct of a succeeding module. It having been found that optimum performance occurs when fluid flow across a panel is directed from bottom to top (with respect to gravity), the inlet duct of each module is positioned at the bottom of the stack and the outlet duct is positioned at the top.

Rather than providing means for blocking the flow in each duct and forcing the fluid to flow in opposite directions in successive subassemblies, as taught in the art, the present invention employs turbulence reduction flanges to divide the stack into subassemblies. These components direct fluid flow from the top of one subassembly to the bottom of the succeeding subassembly, providing bottom-to-top fluid flow throughout the apparatus. Such flow produces improved performance by reducing the turbulence in the base liquid, as well as improving permeate delivery by insuring that the permeate extraction port always is located at areas of lowest pressure on the panel. Also, this design eliminates uneven flow due to entrapped air in the system.

BRIEF DESCRIPTION OF THE DRAWINGS

FIG. 6 is a schematic side view of the ultrafiltration apparatus of the invention.

DETAILED DESCRIPTION OF A PREFERRED EMBODIMENT

This invention generally includes a plurality of panels, each carrying two semi-permeable membranes, arranged in a stack. Flow passages exist between the membranes carried by adjacent panels. The stack is subdivided into a number of modules, each containing a number of panels. A base liqud is introduced into the first module, flows in parallel across the panels of that module, and then flows to succeeding modules, where the parallel flow pattern is repeated. Between modules, the liquid flows through a turbulence reducing flange that dissipates turbulence to increase permeate delivery. Understanding of the invention will be facilitated by first considering the individual panels in detail, and then considering the apparatus as a whole.

Figure 1:
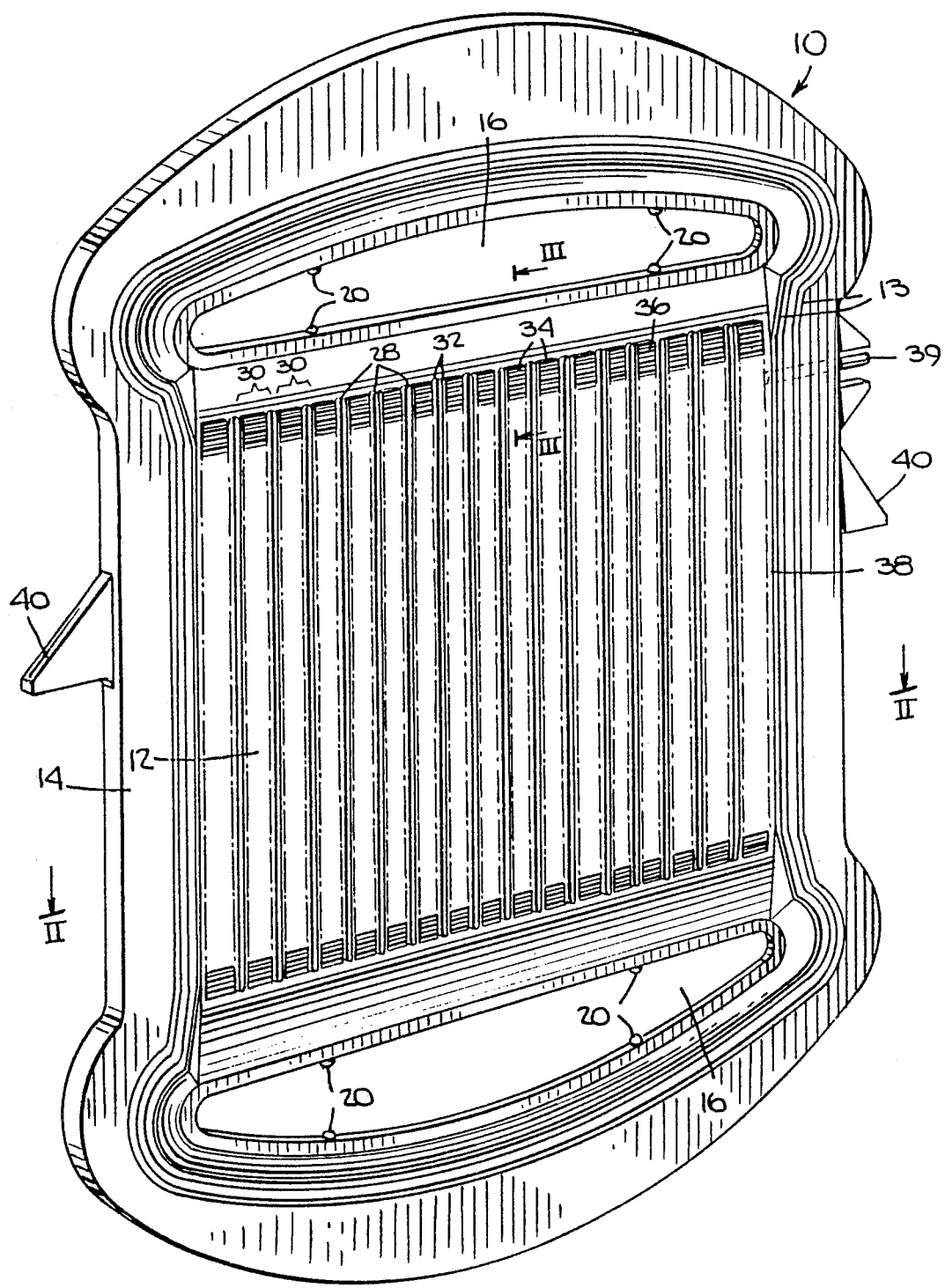
FIG. 1 is a pictorial showing an embodiment of the membrane support of the present invention.
Figure 2:
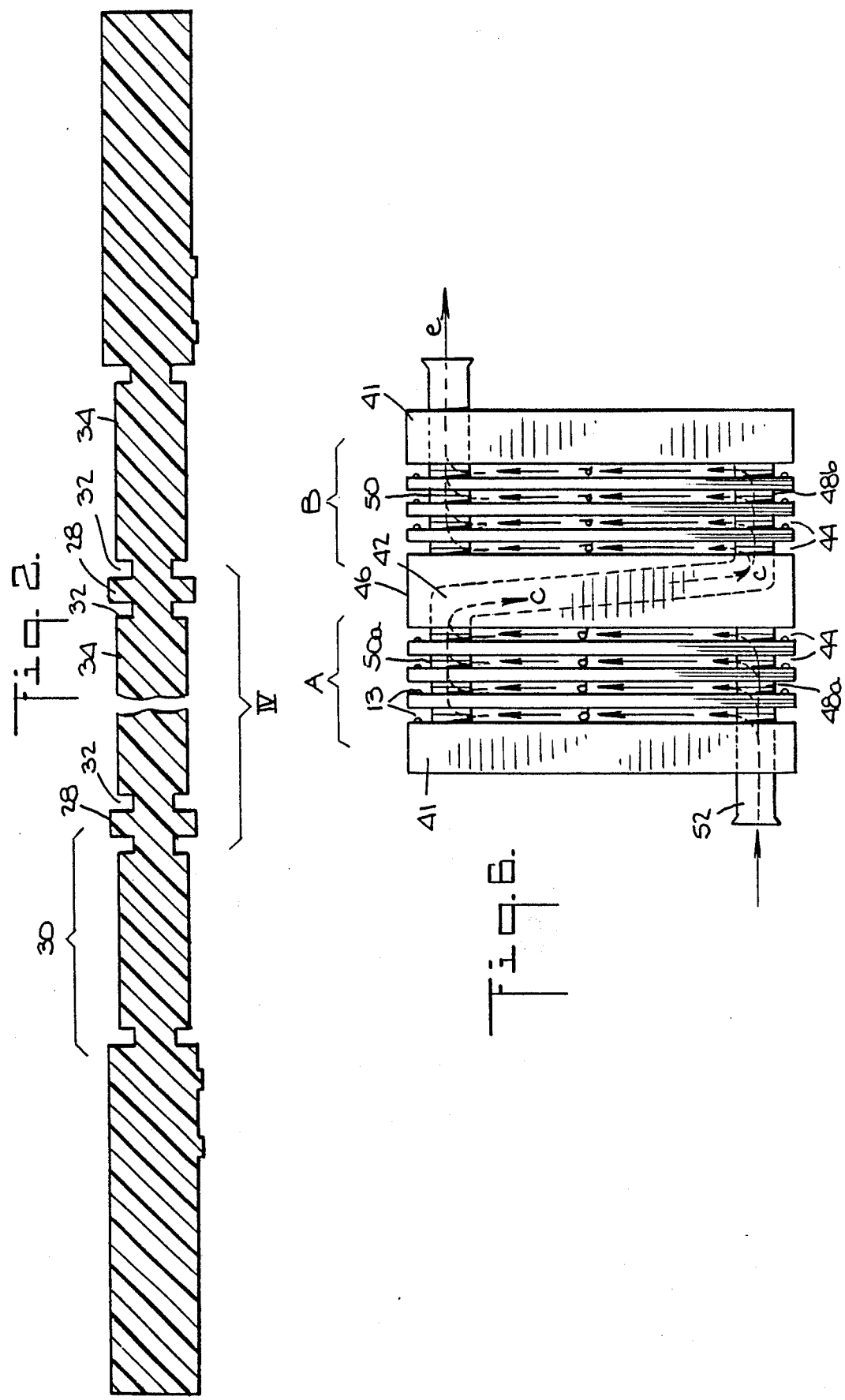
FIG. 2 is a detail side view taken along plane II—II of FIG. 1.

FIG. 1 shows a support panel 10 of the present invention. As seen, the panel is generally flat and rectangular in form, with two faces 12, 14. Discussion herein will focus on the face shown, but it should be understood that the two faces are identical, except as specifically noted. The panel preferably is formed of a molded plastic material, as will be understood by those in the art. For use in the antibiotic industry, where freedom from possible contamination is important, it is preferred to employ a polysulfone plastic, formed into a single-piece plate. The panel shape is not critical, except as it affects the flow pattern, as discussed below. In the embodiment shown, the panel dimensions are about 21 inches by about 15 inches. A raised edge 13 runs around the perimeter of one panel face, this being the only point of dissimilarity between the faces. Preferably, this edge includes two ridges, each having a rounded upper surface. The function of these ridges is explained below.

Two apertures 16 are formed in the periphery of the panel, preferably centered on the panel's long axis. To assure optimum flow in preselected directions, as discussed below, it is preferred to form these apertures as flattened ovals, with the flat side oriented toward the center of the panel. The size of the apertures is chosen consistent with the hydraulic requirements of the overall design.

Figure 5A:
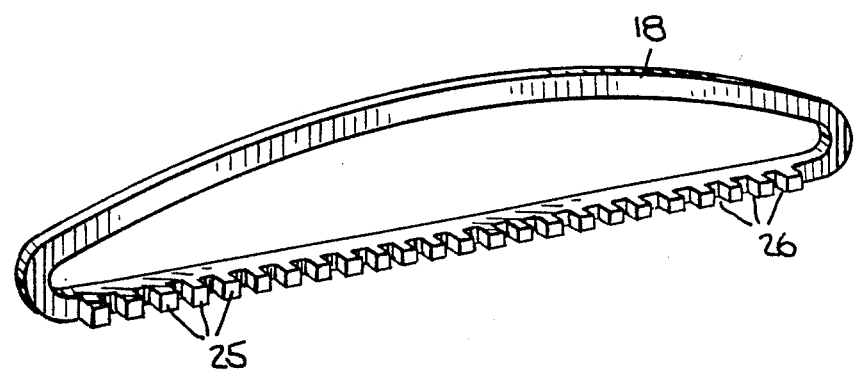
FIGS. 5(a) and (b) are pictorials depicting the distribution ring and sealing ring of the embodiment shown in FIG. 1.
Figure 5B:
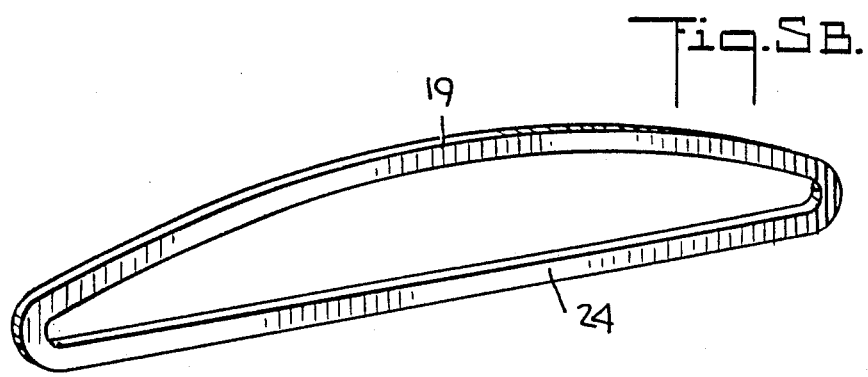

Two rings, shown in FIGS. 5(a) and (b), are carried in each aperture, one at each face. A distribution ring 18 (FIG. 5(a)) includes a series of distribution ports 26 defined by raised teeth 25 formed in the perimeter of the ring, as will be discussed in more detail below. A sealing ring 19 (FIG. 5(b)) has a substantially flat upper surface 24. One ring of each type is carried in each aperture, disposed at opposite ends thereof, arranged so that rings of the same type are carried on the same face of a panel. Both types are fabricated from relatively soft material, such as polypropylene plastic, and the combined thickness of both rings is approximately equal to the distance between the surfaces of adjacent apertures to provide a sealing function, as discussed below. Any suitable mounting means can be employed, but it has been found effective to provide mounting recesses 20 around the perimeter of the aperture, to be engaged by lugs (not shown) projecting from the ring.

Those in the art will understand that other ring designs could be used to provide functions identical to the means preferred here. For example, both rings could have identical teeth, similar to the teeth 25, rather than have one ring with such teeth. It has been found that the chosen design provides the best performance, combined with ease of manufacture.

The structure of a panel surface can be seen in the various views of FIGS. 1, 2, 3, and 4. Longitudinal ribs 28 extend between the apertures, pairs of such ribs defining flow channels 30. These channels are mutually parallel, preferably of equal dimensions, and the number of such channels is chosen to provide uniform flow across the face of the panel, as would be appreciated by those skilled in the art. The embodiment depicted in FIG. 1 has a total of 18 channels and 16 longitudinal ribs, the outermost channels not having ribs at the outer periphery, that number of channels having proved effective to achieve such uniform flow. Two longitudinal channels 32 lie on either side of each longitudinal rib. The top surfaces of the longitudinal ribs should be relatively flat and slightly below the top surface of the raised edge 13.

Between the longitudinal ribs and channels is a series of transverse ribs 34 and channels 36, lying generally at right angles to the longitudinal ribs and channels. As seen more clearly in FIG. 2, the tops of the transverse ribs are slightly below the tops of the longitudinal ribs, and the bottoms of the transverse channels lies above that of the longitudinal channels. The relative depths of the transverse and longitudinal channels is not critical, but it has been found that the arrangement shown is effective in obtaining desired flow pattern, as will be discussed in more detail below.

Other combinations of ribs and channels could be substituted for those discussed above. For example, a single longitudinal channel could be located between each pair of longitudinal ribs. Or, one could dispense with the transverse ribs and channels by providing a series of intermediate longitudinal ribs between the longitudinal ribs discussed these intermediate ribs having tops at a lower level than those of the primary longitudinal ribs. Alternatively, one could utilize an internal permeate drainage system, as is known in the art, rather than the permeate flow system described above. Such systems carry significant disadvantages, however, such as a tendency to leak (most serious in food and antibiotic applications), and a limitation on the permeate flow rate. In addition, such plates are more difficult to manufacture, and hence more costly, than single-piece designs.

A connecting channel 38 encircles the portion of the face into which the ribs and channels are formed. This channel has a depth preferably at least equal to that of the longitudinal channels, and it intersects each longitudinal channel to receive fluid flow from same. Permeate extraction port 39 intersects the connecting channel at a convenient point, and provides a fluid flow path through the side of the panel. As shown, this duct projects outward from the side of the panel, for connection with a means for collecting permeate, such as plastic tubing. Other collection means would require alternate duct structures, as would be clear to those in the art.

Mounting lugs 40 project outward from the side of the panel and adapt the panel for mounting on a suitable carrier, such as a rack. Those in the art will understand methods for adapting the panel to other mounting arrangements that might be desireable.

Figure 3:
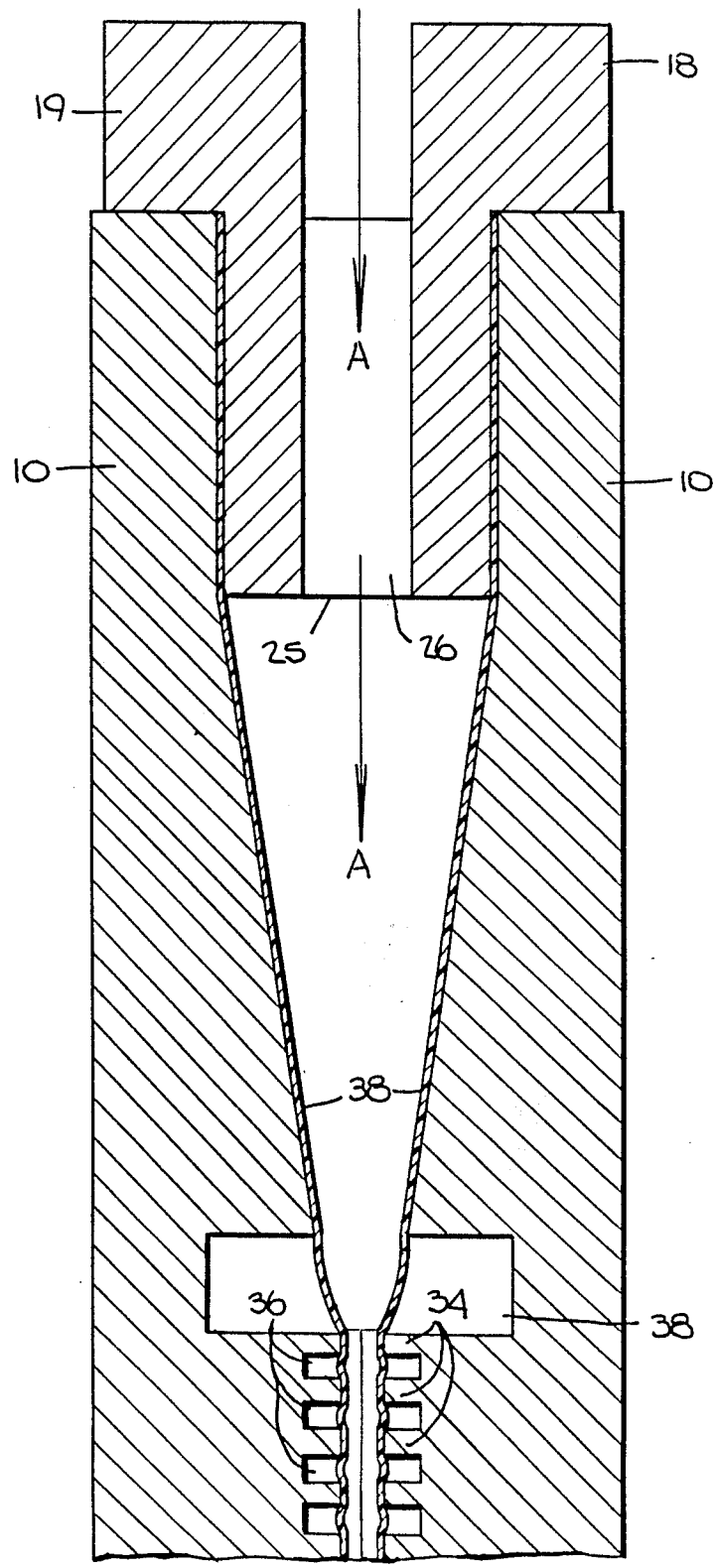
FIG. 3 is a detail cross-sectional side view taken along plane III—III of FIG. 1.
Figure 4:
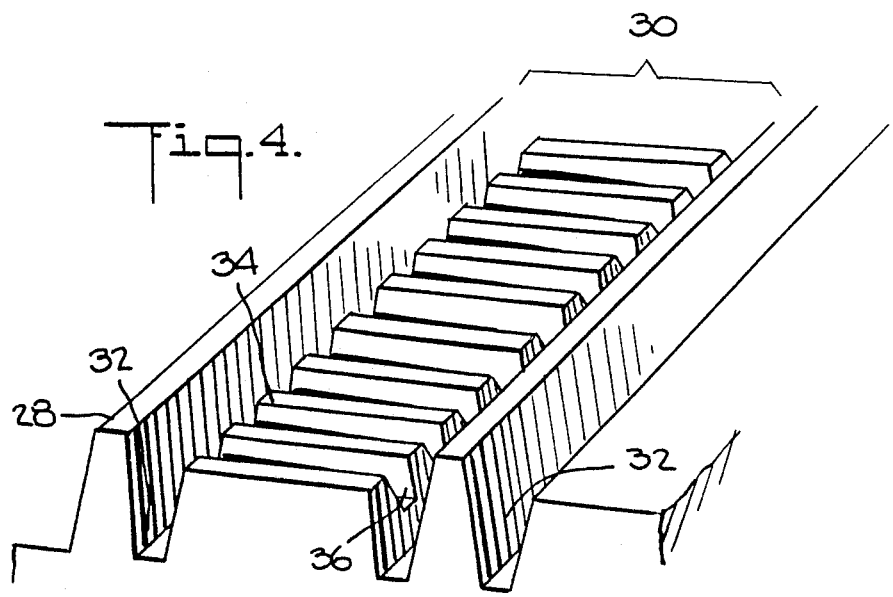
FIG. 4 is a pictorial showing the area IV of FIG. 2.

Operation of a single panel is illustrated in FIG. 3. The panel is prepared for operation by placing a semipermeable membrane 38 upon the panel face. Choice of a suitable membrane material depends upon the specific application, as is wellknown to those in the art. Next, rings are inserted into the apertures, with distribution rings 18 being employed at one panel face and sealing rings 19 on the opposite face. It should be noted that FIG. 3 depicts slight spaces between the rings, panel and membrane; these gaps are present for clarity, as the components in fact come into intimate contact.

The membrane and panel cooperate to separate the base fluid into two fractions. Fluid flows through the distribution ports 26 and into the gap between the panels, following the path of arrow A, in contact with the membrane surface. As it does so, permeate penetrates the membrane and is collected and removed. The distribution ports are disposed in relation to the flow channels 30, and direct fluid toward those portions of the membrane overlying those channels. Also, the longitudinal ribs 28 of adjacent panels bear against one another (as discussed in connection with the overall operation of the apparatus, below), confining retenate flow within the confines of the base liquid flow channels. Because these channels are relatively narrow, fluid velocity is relatively uniform across each channel, and hence across the entire face of the panel. Fluid pressure forces the membrane against the transverse ribs 34; the tops of the transverse ribs are lower than those of the longitudinal ribs, and thus the membrane is urged against their respective top surfaces and the sides of the longitudinal ribs.

Permeate flows through the membrane to collect in transverse channels 36. It should be noted that these channels (and the longitudinal channels 32) are below the level of the membrane, which is supported by the longitudinal and transverse ribs. It has been found that provision of such channels, permitting the permeate to flow between the panel and the bottom surface of the membrane, without making contact with the membrane, results in a relatively free permeate flow and a higher permeate flow rate (or flux). From the transverse channels, permeate flows to the longitudinal channels 32 and thence to the connecting channel 37, which receives the permeate from all of the longitudinal channels. Permeate extraction port 39, in fluid communication with the connecting channel, provides an exit point to conduct the permeate to suitable collection means (not shown).

Turning to a consideration of the device as a whole, the ultrafiltration apparatus is assembled by stacking panels, with apertures 16 in alignment, as seen in FIG. 6. The alignment of apertures results in the formation of two ducts within the stack.

Panels are arranged with raised edges 13 (which lie only on one face of each panel) extending in the same direction, and each such edge is brought into contact with the corresponding flat surface on the opposite face of the adjacent panel, clamping the outer portions of the membranes to form an outer seal for the stack. Also, the distribution rings 18 of one panel make contact with the top surfaces 24 of sealing rings 19 of the adjacent panel, sealing the ducts formed within the stack. Additionally, longitudinal ribs 28 on both faces of each panel make contact, further clamping the membranes and sealing the base liquid flow paths 30 from one another. End plates 41 are placed at either end of the stack, as seen in FIG. 6. These plates should be sufficiently durable to withstand the compressive force necessary to effect stack sealing, and also should be sized to bear completely against an entire panel.

The stack may be supported in any suitable manner known to the art. Preferably, a rack (not shown) is provided, indluding means (not shown) for receiving mounting lugs 40, or whatever mounting means is chosen. Also, those in the art will understand that means for applying a compressive force to the stack must be provided such as readily-available hydraulic press means.

As is known in the art, it is desirable to subdivide the stack into modules. For this purpose, turbulence reduction flanges 46 are inserted into the stack at appropriate intervals. As discussed above, the art teaches the use of a blocking mean to accomplish this purpose, resulting in a flow pattern in which fluid travels in opposite directions in successive modules. It has been found, however, that optimum performance is achieved by causing fluid to flow across a membrane in an upward direction (as used herein, terms such as "top", "bottom", "up" and "down" are used with respect to the direction of gravity). Therefore, the stack according to the present invention is arranged with panels oriented vertically, and with the ducts located at the top and bottom of the stack. The ducts located at the bottom of the stack are inlet ducts 48 and those at the top of the stack are outlet ducts 50.

The relatively rough surface of the duct interior (resulting from stacking panels) inherently produces turbulence, a condition exacerbated by the abrupt change in flow direction at the end of the duct. Further, turbulence increases from duct to duct, so that, for example, the fluid within the fourth module of a stack experiences significantly greate turbulence than the fluid within the first module. Increased turbulence has been observed to lead to early plugging of panel channels and to delamination of membrane material, particularly in modules located toward the end of a stack. Therefore, measures to reduce turbulence would serve to increase performance. As shown in FIG. 6, the turbulence reduction flange includes a conduit 42 formed through the divider, which accepts the output from an outlet duct 50 and conducts fluid to the inlet duct 48 of the succeeding module. This conduit is shaped to match the profile of the panel apertures, with smooth sides. In accordance with general principles of fluid dynamics, provision of such a smooth passageway allows turbulence to dissipate between modules. Preferably, the turbulence reduction flange is formed as a two-piece unit, with the inner surfaces molded to produce the conduit. This unit could be joined permanently, or (as is preferred), one of the units could be provided raised edges similar to those of the panels, for producing a seal between the unit halves. The choice of materials for the flange can be made by those in the art; stainless steel or polysulfone plastic would be most acceptable for food or antibiotic applications.

Operation of the ultrafiltration apparatus proceeds as follows. For purposes of illustration, FIG. 6 depicts a stack comprising two modules, A and B, including three plates 12 in each module. Liquid, which can be, for example, a fermentation broth employed in the production of antibiotics, is introduced into the apparatus through an inlet duct 52, located in the leftmost end plate 41 shown in FIG. 6, by appropriate means (not shown), at a pressure of about 150 psi. This liquid flows into inlet duct 48 of module A, and thence through the distribution ports 26 as discussed above, being directed thereby into the gap 44 between adjacent panels 12, as shown by arrows a. Of course, such flow occurs on each panel in the module, in parallel. The flow pattern occurring on individual panels was discussed above.

Fluid then collects in module A outlet duct 50a and flows through the turbulence reduction flange conduit 42 to the inlet duct 48b of module B, noted by arrows c. The parallel flow pattern is repeated, with fluid proceeding in the gaps between panels, following the paths of arrows d. Outlet duct 50b receives this flow, which exits the apparatus through duct 54 in the rightmost end plate of FIG. 6, shown by arrows e.

It is important to note that the flow pattern of the present apparatus differs substantially from prior art apparatus in that flow occurs in the same direction, from bottom to top, in each module. In this configuration, the permeate extraction port is always located at the low pressure (outlet) end of the panel, promoting improved flow of permeate from the system. In the prior art devices discussed above, of course, half of such ports are located at low pressure areas and half at high pressure areas. Not only does the present invention provide increased flow, but also this arrangement eliminates "dead zones" that occur due to air entrapped on the permeate side of the membrane.

Also, it should be noted that one could divide the stack into panels of two types—one having longitudinal ribs twice the height of those disclosed herein, and the other having a permeate drainage system, such as the transverse ribs, transverse channels, and longitudinal channels disclosed herein. Although such means would be within the scope of the present invention, it is prefereable to employ a single type of plate.

It should also be understood that the apparatus shown in FIG. 6 is configured for illustrative purposes only. Those in the art will understand the requirement for more or fewer modules, or for differing numbers of panels within a module, based upon the application and its requirements.

Operational testing of an ultrafiltration apparatus constructed according to the present invention confirms that the advantages outlined herein do in fact occur in practice. A device according to the invention was compared to a unit constructed alongs the lines of U.S. Pat. No. 3,872,015, to Madsen, as discussed above. Equipment of this type is manufactured by De Danske Sukkerfabriker, a Danish corporation. The base liquid employed was penicillin broth, and two comparative outputs were recorded: flux, in gallons of permeate per square foot of membrane material per day (GFD), and the maximum concentration ratio of the retenate (the ratio of intial base liquid volume to the volume of fluid remaining after processing). The two apparatus contained an identical number of plates, with the following results:

|  | Flux (GFD) | Maximum Concentration Ratio |
| --- | --- | --- |
| /Present Invention | 52 | 2.8 x |
| DDS device | 40 | 2.0 x |
| % difference | 30% | 40% |

Clearly, this invention offers substantial benefits over the prior art.

The apparatus shown in FIG. 6 is configured for illustrative purposes only. Those in the art will understand the requirement for more or fewer modules, and for differing numbers of panels in each module, and they will be able to match such requirements to specific applications.

Of course, those in the art also will understand that modifications and alterations can be made to the embodiments shown here, without departing from the spirit of the invention. For example, the shape of the panel could be altered, or the precise configuration of the flow channels could be changed. These and other changes may be made within the scope of the invention, which is defined solely by the claims appended hereto.

I claim:

1. Apparatus for separating a base liquid into two fractions based upon the molecular weight of the constituents thereof, comprising:

a plurality of semi-permeable membrane means for separating the liquid into the fractions;

a plurality of support panel means for carrying said membrane means, each support means generally having a flat rectangular form and having two support faces adapted for receiving said membrane means on each generally flat face thereof, said support panels having first and second apertures formed in the periphery of said support panel means, said support panel means being disposed in a stack, with said apertures of each said panel in alignment, thereby forming first and second duct means within said stack; a plurality of base liquid flow channel means of substantially equal length and mutually parallel;

permeate flow channel means, underlyng said base liquid flow channel means and separated therefrom by said membrane means;

ring means, disposed in each said first and second aperture of said support panel means, for effecting a liquid-tight seal for said first and second duct means and for directing liquid flow toward said permeate flow channels; and turbulence reduction flange means, disposed in said stack at selected intervals, including means for conducting the fluid to the opposite side of said stack of said support panel means, whereby said stack is subdivided into a plurality of modules, with parallel flow across said membrane members of each said module and series flow between said modules, said parallel flow being in the same direction across each of said membrane members.

2. The apparatus of claim 1, wherein said base liquid flow channel means is defined by longitudinal ribs, extending the length of said flow channel means.

3. The apparatus of claim 2, wherein said permeate flow channel means includes at least one longitudinal channel, disposed between said adjacent longitudinal ribs; and transverse ribs, generally at right angles to said longitudinal channels and ribs, extending between adjacent longitudinal channels and defining transverse channels in fluid communication with said longitudinal channels.

4. The apparatus of claim 3, wherein two said longitudinal channels are disposed on either side of said longitudinal ribs.

5. The apparatus of claims 3 or 4, wherein the height of said longitudinal ribs is greater than the height of said transverse ribs.

6. The apparatus of claims 3 or 4, wherein the depth of said longitudinal channel is greater than the depth of said transverse channel.

7. The apparatus of claims 3 or 4, wherein said permeate flow channel means further comprising connecting channel means in fluid communication with said permeate flow channels; and permeate extraction port means, in fluid communication with said connecting channel means, for allowing an output of the liquid fraction separated from the base liquid by said membrane means.

8. The apparatus of claims 2 or 14, wherein said permeate flow channel means includes a plurality of longitudinal channels disposed between said adjacent longitudinal ribs.

9. The apparatus of claim 1, wherein said ring means includes distribution ring means for directing fluid flow in selected directions on said panel means, disposed around the periphery of each said aperture positioned at a first said panel face, and sealing ring means having a substantially flat surface projecting above a second said panel face disposed around the periphery of each said aperture at said second panel face.

10. The apparatus of claim 9, wherein said distribution ring means includes distribution port means for directing fluid flow toward each of said base liquid flow channel means.

11. The apparatus of claim 1, wherein said first and second apertures extend substantially the combined width of said base liquid flow channel means.

12. The apparatus of claims 1 or 11, wherein said first and second apertures have a substantially flat side, which extends toward the center of said panel means.

13. A support panel for carrying a semipermeable membrane used in separating a base liquid into two fractions based upon the molecular weight of the constituents thereof, comprising:

two generally flat support faces adapted for receiving a membrane thereon and including first and second apertures formed in the periphery of said panel faces at opposite ends thereof, for providing liquid communication between adjacent panels;

a plurality of base liquid flow channel means of substantially equal length for providing liquid communication between said first and second apertures, each said channel being substantially parallel to other said channels; and permeate flow channel means for conducting a selected fraction of the base liquid, underlying said base liquid flow channel means and separated therefrom by said membrane.

14. The panel of claim 13, wherein said base liquid flow channel means is defined by longitudinal ribs extending the length of said flow channel means.

15. The panel of claim 14, wherein said permeate flow channel means includes at least one longitudinal channel, disposed between adjacent said longitudinal ribs; and transverse ribs, generally at right angles to said longitudinal channels and ribs, extending between adjacent longitudinal channels and defining transverse channels in fluid communication with said longitudinal channels.

16. Tne appararus or claims 14 or 15, wherein two of said longitudinal channels are disposed on either side of said longitudinal ribs.

17. The panel of claims 14 or 15, wherein the height of said longitudinal ribs is greater than the height of said transverse ribs.

18. The apparatus of claim 15 wherein the depth of said longitudinal channel is greater than the depth of said transverse channel.

19. The apparatus of claim 15, wherein said permeate flow channel means further includes connecting channel means in fluid communication with said permeate flow channels; and permeate extraction port means, in fluid communication with said connecting channel means, for allowing an output of the liquid fraction separated from the base liquid by said membrane means.

20. The panel of claim 13, further including ring means, disposed in said first and second apertures, for directing liquid flow toward said permeate flow channels said ring means effecting a liquid-tight seal between a stacked plurality of said panels.

21. The panel of claim 20, wherein said ring means includes distribution ring means disposed on a first said panel face around the periphery of and extending into a selected said aperture for directing fluid flow in selected directions and blocking flow in other directions and sealing ring means for effecting a liquid-tight seal with an adjacent said panel having a substantially flat surface projecting above said panel face disposed peripherally about said selected aperture at the said panel face opposite said first panel face.

22. The panel of claim 21, wherein said distribution ring means includes distribution port means for directing fluid flow toward each of said base liquid flow channel means.

23. The panel of claim 13, wherein said first and second apertures extend substantially the combined width of said base liquid flow channel means.

24. The panel of claim 13 of claim 23, wherein said first and second apertures have a substantially flat side, extending toward the center of the panel.

* * * * *